· US009482835B2

(12) United States Patent
Granger et al.

(10) Patent No.: US 9,482,835 B2
(45) Date of Patent: Nov. 1, 2016

(54) EXTREME ENVIRONMENT OPTICAL FIBER CABLE WITH CRACK-RESISTANT LAYER

(71) Applicant: Corning Optical Communications LLC, Hickory, NC (US)

(72) Inventors: Mitchell Preston Granger, Vale, NC (US); Jason Clay Lail, Conover, NC (US)

(73) Assignee: CORNING OPTICAL COMMUNICATIONS LLC, Hickory, NC (US)

( * ) Notice: Subject to any disclaimer, the term of this patent is extended or adjusted under 35 U.S.C. 154(b) by 182 days.

(21) Appl. No.: 14/317,940

(22) Filed: Jun. 27, 2014

(65) Prior Publication Data

US 2015/0378119 A1     Dec. 31, 2015

(51) Int. Cl.
| | | |
|---|---|---|
| *G02B 6/44* | (2006.01) | |
| *B29K 23/00* | (2006.01) | |
| *B29D 11/00* | (2006.01) | |

(52) U.S. Cl.
CPC .......... *G02B 6/4413* (2013.01); *G02B 6/4415* (2013.01); *G02B 6/4436* (2013.01); *G02B 6/4486* (2013.01); *G02B 6/4488* (2013.01); *B29D 11/00663* (2013.01); *B29K 2023/08* (2013.01); *B29K 2995/0016* (2013.01)

(58) Field of Classification Search
None
See application file for complete search history.

(56) References Cited

U.S. PATENT DOCUMENTS

| | | | |
|---|---|---|---|
| 4,844,575 A | 7/1989 | Kinard et al. | |
| 5,930,431 A | 7/1999 | Lail et al. | 385/100 |
| 6,137,936 A | 10/2000 | Fitz et al. | |
| 6,167,178 A | 12/2000 | Nave | |
| 8,577,196 B1 | 11/2013 | McNutt | |
| 8,639,075 B1 | 1/2014 | Burnett | 385/107 |
| 8,649,644 B2 | 2/2014 | Greenwood, III et al. | 385/107 |
| 2002/0009272 A1 | 1/2002 | Parris | |
| 2003/0091307 A1 | 5/2003 | Hurley et al. | |
| 2009/0274426 A1 | 11/2009 | Lail | 385/105 |
| 2011/0286705 A1 | 11/2011 | Blazer et al. | 385/107 |
| 2012/0051702 A1 | 3/2012 | Blazer et al. | 385/113 |
| 2013/0216192 A1 | 8/2013 | Gimblet et al. | |

OTHER PUBLICATIONS

Patent Cooperation Treaty, International Search Report and Written Opinion for PCT/US15/37093, mail date Nov. 4, 2015, 14 pages.
Chen et al., Analysis and improvement of Halogen-free Flame-retardant cable cracking resistance, Proceedings of the International Wire & Cable Symposium (IWCS), Inc., Nov. 10-13, 2013, 6 pages, Charlotte, North Carolina, USA.

*Primary Examiner* — Jerry Rahll
(74) *Attorney, Agent, or Firm* — William D. Doyle (57) ABSTRACT

A high-temperature and crack resistant optical communication cable is provided. The cable includes an extruded cable body formed from a polymer material defining a channel within the cable body. The cable includes a plurality of optical transmission elements located within the channel. The cable includes a reinforcement sheet wrapped around the plurality of optical transmission elements. The cable includes an adhesion barrier wrapped around the wrapped reinforcement sheet. The adhesion barrier layer is a substantially uninterrupted adhesion barrier layer such that the adhesion barrier layer acts to prevent substantial adhesion between the polymer material of the cable body and an outer surface of the wrapped reinforcement sheet.

17 Claims, 3 Drawing Sheets

EXTREME ENVIRONMENT OPTICAL FIBER CABLE WITH CRACK-RESISTANT LAYER

BACKGROUND

The disclosure relates generally to optical communication cables and more particularly to optical communication cables including a protective layer configured to control interaction between the outer cable jacket and an internal armor layer. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to a high-temperature and crack resistant optical communication cable. The cable includes an extruded cable body formed from a polymer material, and the cable body has an inner surface defining a channel within the cable body. The cable includes a plurality of optical transmission elements located within the channel. The cable includes a reinforcement sheet having a first lateral edge and an opposing second lateral edge. The reinforcement sheet is wrapped around the plurality of optical transmission elements such that the first lateral edge of the reinforcement sheet overlaps the second lateral edge of the reinforcement sheet forming a reinforcement overlap portion. The cable includes an adhesion barrier layer having a first lateral edge and a second lateral edge. The adhesion barrier layer is wrapped around the wrapped reinforcement sheet such that the first lateral edge of the adhesion barrier layer overlaps the second lateral edge of the adhesion barrier layer forming an adhesion barrier overlap portion. The adhesion barrier layer is a substantially uninterrupted adhesion barrier layer such that the adhesion barrier layer acts to prevent substantial adhesion between the polymer material of the cable body and an outer surface of the wrapped reinforcement sheet.

An additional embodiment of the disclosure relates to an optical communication cable including a cable jacket formed from a polymer material. The cable jacket has an inner surface defining a channel within the cable jacket. The cable includes a plurality of optical transmission elements located within the channel and an armor layer wrapped around the plurality of optical transmission elements. The cable includes a sleeve of material surrounding the armor layer. The sleeve has an inner surface facing the armor layer and an outer surface facing the cable jacket. Both the inner surface and the outer surface of the sleeve extend entirely around the armor layer when viewed in a cross-section perpendicular to a long axis of the channel, and both the inner surface and the outer surface of the sleeve are continuous lengthwise for at least 50 centimeters of the length of the cable.

An additional embodiment of the disclosure relates to a method of forming a high-temperature and crack resistant optical communication cable. The method includes providing a plurality of elongate optical transmission elements. The method includes wrapping a sheet of reinforcement material around the plurality of elongate optical transmission elements such that the plurality of elongate optical transmission elements are located within a channel defined by an inner surface of the wrapped sheet of reinforcement material. The method includes wrapping an adhesion barrier sheet around the wrapped sheet of reinforcement material such that the plurality of elongate optical transmission elements and the wrapped sheet of reinforcement material are located within a channel defined by an inner surface of the wrapped adhesion barrier sheet. The method includes extruding polymer material over the wrapped adhesion barrier sheet to form a cable jacket. The polymer material is extruded at an extrusion temperature that limits penetration of the extruded polymer material through the adhesion barrier to reduce adhesion between the cable jacket and the reinforcement material.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

DETAILED DESCRIPTION

Referring generally to the figures, various embodiments of an optical communication cable (e.g., a fiber optic cable, an optical fiber cable, etc.) are shown. In general, the cable embodiments disclosed herein include a cable body or jacket typically formed from a polymer material (e.g., a fire resistant polymer, such as low smoke zero halogen polyethylene). A group of optical fibers is wrapped in a protective, reinforcement or armor material (e.g., a corrugated metal sheet of material), and the armored group of optical fibers is positioned in a central channel of the cable body. Generally, the cable jacket provides physical support and protection to the optical fibers within the cable, and the armor material provides additional reinforcement to the optical fibers within the cable body.

The wrapped sheet of armor material includes an overlapped portion created by the overlapping of opposing edges of the sheet of armor material as the armor is wrapped around the optical fibers. The overlapped section and, in particular, the exposed lateral edge of the upper portion of the overlap may contact the inner surface of the cable body that defines the channel of the cable jacket. This interaction or contact may tend to create a split within the cable jacket particularly upon twisting of the cable (such splitting may be referred to in the field as "cable zippering").

In addition, in some cable designs, a certain amount of adhesion may occur between the outer surface of the armor layer and the inner surface of the cable jacket. Such adhesion may be formed via adhesion formed as the cable jacket is extruded over the armor layer, or in some cable designs, this adhesion may be facilitated by the addition of glue or other bonding material placed between the armor and the cable jacket. However, it has been identified that adhesion between the rigid material of the armor layer and the relatively compliant material of the cable jacket results in stress concentration points that may increase the potential for cable jacket cracking, particularly in high-temperature environments, for example, in cables for industrial tray-rate applications in areas of the world having warmer climates. Further, high-levels of bonding between the armor layer and the cable jacket may make it more difficult for the armor layer to be accessed within the cable jacket (e.g., for attaching a ground wire to the cable jacket).

In the cable embodiments discussed herein, the optical communication cable includes a layer of material surrounding the armor layer and positioned between the armor layer and the cable jacket. In various embodiments, the layer of material is a relatively thick and uninterrupted layer of nonwoven material that is wrapped around the armor layer. In such embodiments, the layer of nonwoven material acts as an adhesion barrier limiting or preventing bonding between the armor layer and the cable jacket that may otherwise occur as the cable jacket is extruded over the armor layer. Thus, by limiting this adhesion, the cable embodiments discussed herein do not generate the stress concentrations present in cables in which bonding occurs between the armor layer and the cable jacket. Further, the nonwoven material is a relatively compliant, flexible material that acts as physical barrier between the armor overlap and the cable jacket limiting the ability of the upper edge of the armor overlap to engage with the inner surface of the cable jacket in a manner that cracks the cable jacket. Thus, the layer of nonwoven material may act to resist, limit or prevent split formation that may otherwise be caused by the contact between the armor overlap and the material of the cable jacket.

In specific embodiments, the nonwoven material of the adhesion barrier layer is selected to provide the combined functions of limiting/preventing adhesion between the armor and the cable jacket and protecting the cable jacket material from the armor overlap. In various embodiments, the nonwoven material has sufficient thickness to prevent penetration of the extruded cable jacket material through the nonwoven material thereby limiting or preventing contact between the armor layer and the extruded material of the cable jacket that may otherwise result in bonding between the two layers. In addition, the thickness of the nonwoven material also acts as a buffer between the edge of the armor overlap and the cable jacket material. In particular embodiments, the nonwoven barrier layer discussed herein is particularly useful in protecting cable jackets made from low smoke zero halogen (LSZH) polymers, such as LSZH polyethylene, that may be susceptible to crack formation, particularly in warm climate installations.

In additional embodiments, a method of forming a fiber optic communication cable with limited or no adhesion between the armor layer and the cable jacket is provided. In such embodiments, an adhesion barrier, such as a layer of uninterrupted nonwoven material, is positioned around the armor layer before cable jacket extrusion. Next the cable jacket is extruded around the adhesion barrier layer. In various embodiments, the cable jacket material is extruded at lower than typical temperatures that have been identified as limiting or preventing penetration of the jacket material through the layer of nonwoven material during extrusion.

Figure 1:
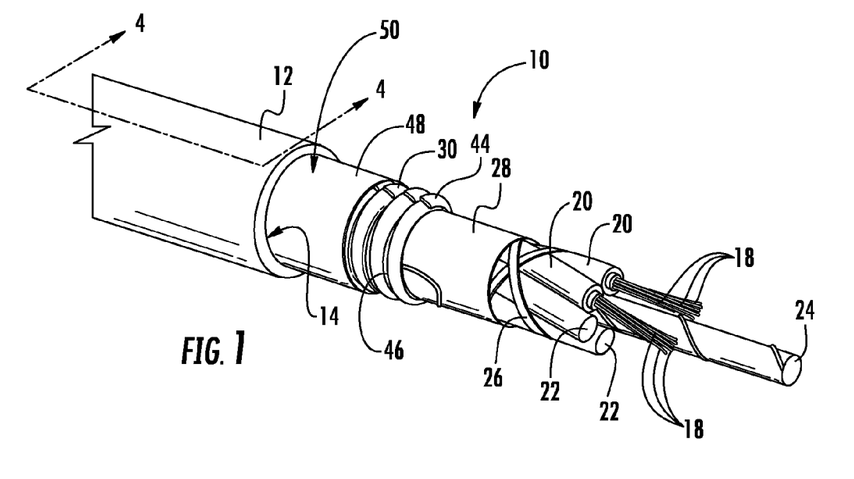
FIG. 1 is a perspective view of an optical communication cable according to an exemplary embodiment.
Figure 2:
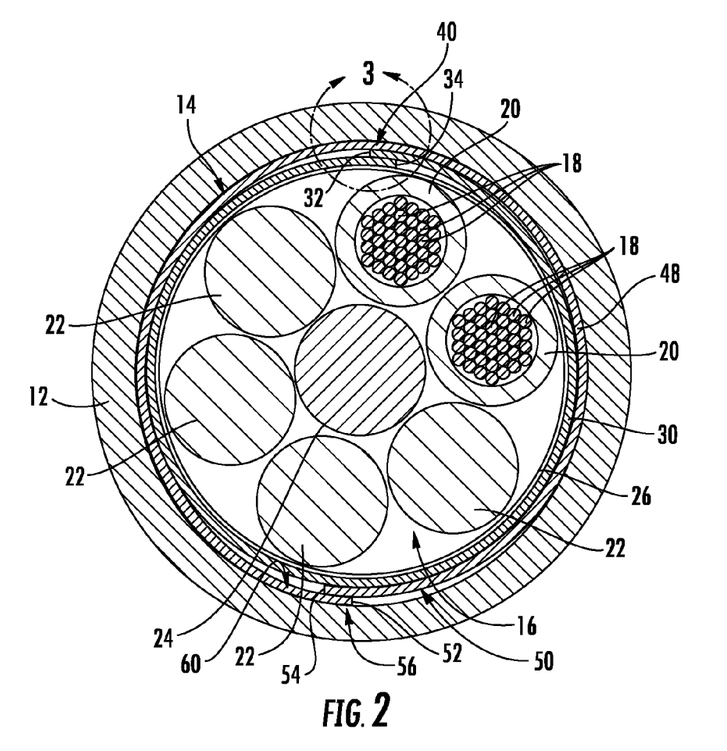
FIG. 2 is an axial cross-sectional view of the cable of FIG. 1 according to an exemplary embodiment.

Referring to FIGS. 1 and 2, an optical communication cable, shown as cable 10, is shown according to an exemplary embodiment. Cable 10 includes a cable body, shown as cable jacket 12, having an inner surface 14 that defines a channel, shown as central bore 16. In one embodiment, cable jacket 12 may be made from a LSZH polyethylene, and in other embodiments, cable jacket 12 may be made from a different fire resistant polymer material. A plurality of core elements (e.g., optical transmission elements, strength members or fibers, filler rods, etc.) are located within central bore 16. In the embodiment of FIG. 1, a plurality of optical transmission elements, shown as optical fibers 18, are located within bore 16. Generally, cable 10 provides structure and protection to optical fibers 18 during and after installation (e.g., protection during handling, protection from elements, protection from vermin, etc.).

In the embodiment shown in FIGS. 1 and 2, bundles of optical fibers 18 are located within buffer tubes 20. One or more filler rods 22 are also located within bore 16. Filler rods 22 and buffer tubes 20 are arranged around a central support rod 24 formed from a material such as glass-reinforced plastic or metal. Helically wound binders 26 are wrapped around buffer tubes 20 and filler rods 22 to hold these elements in position around support rod 24. A barrier material, such as water barrier 28, is located around the wrapped buffer tubes 20 and filler rods 22.

A reinforcement sheet or layer, shown as armor layer 30, is located outside of water barrier 28. Armor layer 30 is wrapped around the interior elements (including optical fibers 18) of cable 10 such that armor layer 30 surrounds optical fibers 18 within bore 16. Armor layer 30 generally extends all or substantially all of the axial length of cable 10. Armor layer 30 generally provides an additional layer of protection to fibers 18 within cable 10, and may provide resistance against damage (e.g., damage caused by contact or compression during installation, damage from the elements, damage from rodents, etc.)

Figure 3:
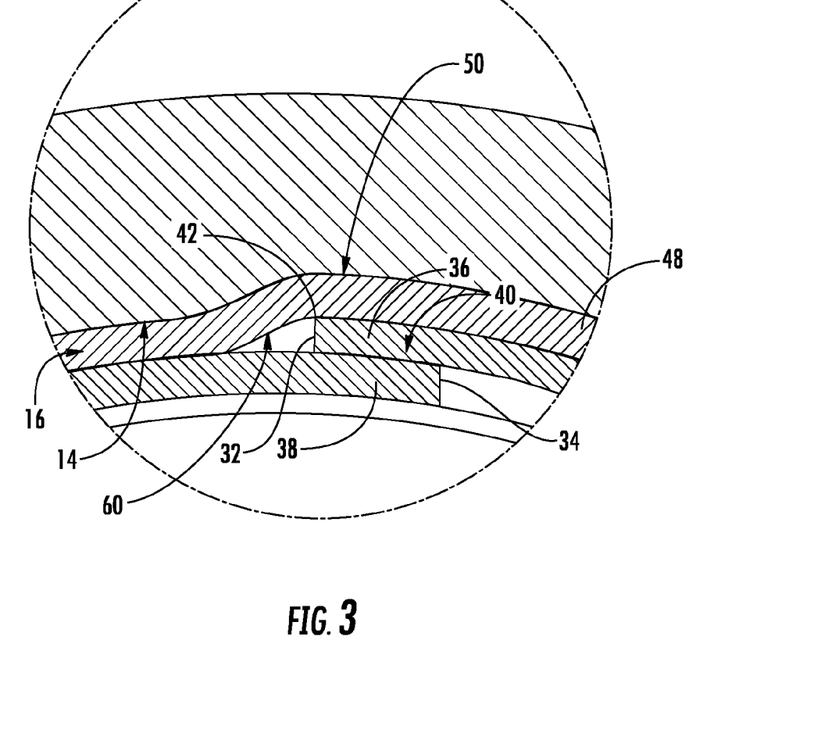
FIG. 3 is a detailed axial cross-sectional view of a portion of the cable of FIG. 1 according to an exemplary embodiment.

As shown best in FIGS. 2 and 3, armor layer 30 has a first lateral edge 32 and a second lateral edge 34. In the embodiment shown, lateral edges 32 and 34 are substantially parallel to the longitudinal axis of cable 10 and of fibers 18. Referring to FIGS. 2 and 3, armor layer 30 is wrapped such that first lateral edge 32 passes over or overlaps second lateral edge 34. In this arrangement, a section 36 of armor layer 30 adjacent first lateral edge 32 is located above a section 38 of armor layer 30 adjacent second lateral edge 34 forming an overlap portion 40. In one embodiment, an upper surface of section 38 is in contact with a lower surface of section 36 such that the thickness of overlap portion 40 is about twice the thickness the material of armor layer 30. In various embodiments, the radial dimension or thickness of armor layer 30 is between 0.10 mm and 0.25 mm, and thus, in this embodiment, the thickness of overlap portion 40 is between 0.20 mm and 0.5 mm. With section 38 located below section 36, the upper corner 42 of lateral edge 32 defines the outer most corner of armor layer 30.

In various embodiments, armor layer 30 may be formed from a variety of strengthening or damage resistant materials. In the embodiment shown in FIG. 1, armor layer 30 is formed from a corrugated sheet of metal material having an alternating series of peaks 44 and troughs 46. In one embodiment, the corrugated metal is steel. In other embodiments, other non-metallic strengthening materials may be used. For example, armor layer 30 may be formed from fiberglass yarns (e.g., coated fiberglass yarns, rovings, etc.). In some embodiments, armor layer 30 may be formed from plastic materials having a modulus of elasticity over 2 GPa, and more specifically over 2.7 GPa. Such plastic armor layers may be used to resist animal gnawing and may include animal/pest repellant materials (e.g., a bitter material, a pepper material, synthetic tiger urine, etc.).

Referring to FIG. 1, cable 10 includes a crack resisting and/or adhesion barrier layer, shown as sleeve 48 located between armor layer 30 and cable jacket 12. In one embodiment, sleeve 48 is a layer of nonwoven material located between armor layer 30 and cable jacket 12. In other embodiments, sleeve 48 may be formed from other materials that limit adhesion between cable jacket 12 and armor layer 30. For example, in various embodiments, sleeve 48 may be formed from a woven fabric tape, or from polymer films such as Mylar, Kapton, etc. In various embodiments, instead of or in addition to sleeve 48, cable 10 may include an adhesion barrier formed from a particulate material such as talc or mica. In certain embodiments, sleeve 48 may be formed from any material that acts as a physical barrier at the armor overlap, that acts as a thermal barrier limiting melt-bonding of the material cable jacket 12 to armor layer 30 and/or as a physical barrier that limits adhesion between the material of cable jacket 12 and armor layer 30.

As noted above, in one embodiment, sleeve 48 acts as an adhesion barrier limiting or preventing adhesion/bonding that may otherwise occur between the cable jacket 12 and armor 30. It is believed that, by limiting adhesion between the material of cable jacket 12 and armor 30, crack formation can be decreased by eliminating/reducing stress-concentration sites that occur at areas of adhesion between cable jacket 12 and armor 30. In various embodiments, sleeve 48 is a substantially uninterrupted barrier layer of nonwoven material that acts to prevent substantial bonding between the material of cable body 12 and the outer surface of armor layer 30. In such embodiments, sleeve 48 limits or prevents adhesion by acting as a physical barrier preventing or limiting flowable polymer material of cable jacket 12 from coming into contact with and melt-bonding to the outer surface of armor layer 30 during extrusion of the cable jacket 12.

In various embodiments, to provide the adhesion barrier and/or crack resistant properties discussed herein, sleeve 48 is formed from a nonwoven material having a thickness between 150 micrometers and 450 micrometers and more specifically between 200 micrometers and 400 micrometers. In a specific embodiment, sleeve 48 is formed from a nonwoven material having a thickness between 200 micrometers and 250 micrometers. In one embodiment, sleeve 48 is formed from a material having a thickness such that the ratio of the thickness of the material of sleeve 48 to the thickness of overlap portion 40 of armor layer 30 is between 1:1 and 1:4, and specifically is 1:2.

Various types of nonwoven materials and material composites may be used to form sleeve 48. In one embodiment, sleeve 48 is formed from two layers of nonwoven material, an inner layer and outer layer, containing a particulate material, such as water absorbing (SAP) particles in a space between the two layers. In another embodiment, sleeve 48 is formed from a sheet of nonwoven material including either an inner or outer layer of Mylar material. In one embodiment, sleeve 48 is formed from a Mylar-backed water swellable material. In another embodiment, the adhesion barrier layer is formed from a layer of particulate material such as talc, deposited along the outer surface of armor layer 30 that limits adhesion between jacket 12 and armor 30. In various embodiments, sleeve 48 is a nonwoven material formed from one or more of the following materials, cotton, rayon, acetate, nylon, wool, polyesters, polyamides and acrylics. In various embodiments, sleeve 48 is formed from one or more of different classifications of nonwoven materials, including wet bonded nonwovens, dry bonded nonwovens, spun bonded nonwovens, staple fiber nonwovens, filament fiber nonwovens, etc.

In various embodiments, sleeve 48 is substantially uninterrupted such that sleeve 48 includes a very low macroscopic hole density and/or includes no macroscopic through-holes or through bores extending between the radially outer surface and the radially inner surface of sleeve 48. It will be understood, of course, that a nonwoven material includes microscopic pores, gaps, spaces, etc. located on the surfaces of and within the nonwoven material, and in various embodiments, as used herein, the substantially uninterrupted nonwoven sleeve 48 may include such microscopic features. In one embodiment, sleeve 48 is substantially uninterrupted in that it includes a through-hole density of less than 0.1 percent. In other embodiments, sleeve 48 is substantially uninterrupted in that it includes a through-hole density of less than 5 percent, and more specifically less than 1 percent. In such embodiments, through-hole density is the ratio of the portion of the outer surface of sleeve 48 occupied by the opening of any macroscopic through-holes to the total surface area of outer surface 50 of sleeve 48 within cable 10. In various embodiments as shown in FIG. 2, both inner surface 60 and the outer surface 50 of sleeve 48 extend entirely around armor layer 30 when viewed in a cross-section perpendicular to a long axis of the channel (as shown in FIG. 2), and both inner surface 60 and the outer surface 50 of sleeve 48 are continuous lengthwise for at least 10 centimeters of the length of cable 10 and more specifically for at least 50 centimeters of the length of cable 10. Thus, it should be understood that a substantially uninterrupted sleeve 48 may include, in some embodiments, a relatively low number of macroscopic through-holes that does not substantially increase the amount of adhesion experienced between the material of cable jacket 12 and armor 30.

In other embodiments, sleeve 48 is substantially uninterrupted such that sleeve 48 substantially limits penetration of the polymer material of cable jacket 12 through sleeve 48 during extrusion and thereby limits the potential surface area of contact between the inner surface of cable jacket 12 and armor layer 30. In such embodiments, by limiting the potential surface area of contact between the inner surface of cable jacket 12 and armor layer 30, the amount of bonding that may form between cable jacket 12 and armor layer 30 is reduced or eliminated.

In one embodiment, sleeve 48 is configured such that the maximum penetration of the polymer material of cable jacket 12 into sleeve 48 (e.g., the distance that the polymer material of cable jacket 12 extends into sleeve 48 below the radially outermost surface of sleeve 48) is less than or equal to 20 micrometers at any point along the length of cable 10. In another embodiment, sleeve 48 is configured such that sleeve 48 includes at least one section having an outer surface area of 50 square centimeters in which the maximum penetration of the polymer material of cable body 12 into sleeve 48 is less than 20 micrometers. In another embodiment, sleeve 48 is configured such that at more than fifty percent of the outer surface of sleeve 48 the maximum penetration of the polymer material of cable body 12 into sleeve 48 is less than 20 micrometers. In other embodiments, sleeve 48 is configured such that the volume of the portion of sleeve 48 that is penetrated by the material of cable jacket 12 is less than or equal to 10% of the total volume of sleeve 48 within cable 10, and in another embodiment, sleeve 48 is configured such that the volume of the portion of sleeve 48 that is penetrated by the material of cable jacket 12 is less than or equal to 5% of the total volume of sleeve 48 within cable 10. In other embodiments, sleeve 48 is configured such that the maximum penetration of the material of cable jacket 12 into the material of sleeve 48 is less than 90 percent of the thickness of sleeve 48.

In various embodiments, by limiting the adhesion between the materials of cable jacket 12 and armor 30, cable 10 is configured such that separation of the material of cable jacket 12 from the material of armor 30 requires significantly lower forces than in many typical cables. In various embodiments, sleeve 48 limits adhesion between cable jacket 12 and the material armor 30 such that the peel force required to separate or peel one side of cable jacket 12 (i.e., one half or the cable jacket in the circumferential direction) from armor layer 30 is less than 10 lbs., and more specifically, is less than 5 lbs. In various embodiments, peel force may be measured by fixing the cable, including the armor layer, in place using a device such as a clamp or vice, cutting the cable jacket lengthwise on two opposite sides of the cable jacket, and then measuring the force required to pull half of the jacket away from the armor layer in a direction perpendicular and away from the cable jacket. In a specific embodiment, no adhesion occurs between armor layer 30 and cable jacket 12, and in such embodiments, the peel force required to separate one side of cable jacket 12 is less than 5 lbs. and results from bending or the weight of cable jacket 12.

In various embodiments, while limiting the peel force needed to separate cable jacket 12 and armor 30, cable 10 may be further configured to provide easy access to armor 30 within cable 10. Thus, in various embodiments, sleeve 48 bonds to jacket 12 such that a single opening action opens both jacket 12 and sleeve 48. This bonding between sleeve 48 and jacket 12 allows one to access armor layer 30 (e.g., for attaching a ground wire) utilizing a single opening action. In various embodiments, the bonding between sleeve 48 and the inner surface of jacket 12 is formed during jacket extrusion, and, in another embodiment, the bonding between sleeve 48 and the inner surface of jacket 12 is formed using a glue or other bonding agent.

In addition to the adhesion barrier functions discussed herein, sleeve 48 also limits or reduces cable jacket crack formation through the physical arrangement and positioning of sleeve 48. Referring to FIG. 2, sleeve 48 is formed from a generally elongate rectangular piece of material and has a first lateral edge 52 and a second lateral edge 54. In the embodiment shown, lateral edges 52 and 54 are substantially parallel to the longitudinal axis of cable 10 and of fibers 18. In the embodiment shown, sleeve 48 is wrapped such that first lateral edge 52 passes over or overlaps second lateral edge 54. In this arrangement, a section of sleeve 48 adjacent first lateral edge 52 is located radially outside of a section of sleeve 48 adjacent second lateral edge 54 forming a sleeve overlap portion 56.

Referring to FIG. 2, sleeve overlap portion 56 is circumferentially offset from armor overlap section 40 such that no portion of sleeve overlap portion 56 overlaps or is radially aligned with armor overlap section 40. In various embodiments, armor overlap section 40 may be located generally within plus or minus 45 degrees of the 12 o'clock position, and sleeve overlap portion 56 may be located generally within plus or minus 45 degrees from the 6 o'clock position. In a specific embodiment, armor overlap section 40 is spaced between 160 degrees and 200 degrees, and more specifically between 170 degrees and 190 degrees, away from the sleeve overlap portion 56. In such embodiments, arranging the components of cable 10 such that increased thickness of the two overlap sections do not overlap and/or are positioned on opposite sides of the cable limits additional stresses on cable jacket 12 that may otherwise occur if the two overlap section were located at the same radial position.

In addition to the adhesion resistant properties, in various embodiments, sleeve 48 also acts as a physical barrier limiting direct engagement between armor overlap portion 40 and inner surface 14 of cable jacket 12. As shown best in the detailed view of FIG. 3, sleeve 48 creates a contiguous barrier located between armor overlap portion 40 and specifically between corner 42 of armor 30 and inner surface 14. In this embodiment, the portion of sleeve 48 located above corner 42 provides a compliant barrier that blocks corner 42 from engaging with the material of cable jacket 12 and thereby resists or prevents split formation at the interaction between corner 42 and jacket 12. Thus, in this embodiment, as cable 10 is bent, twisted, etc., sleeve 48 acts to constrain and limit the force experienced by inner surface 14 of cable jacket 12 via interaction with overlap portion 40 and corner 42.

Figure 4:
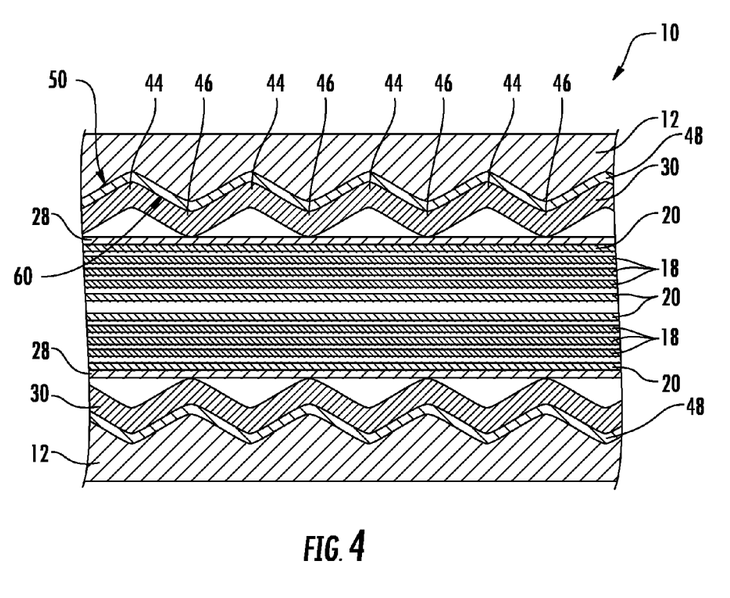
FIG. 4 is a longitudinal cross-sectional view of the cable of FIG. 1 according to an exemplary embodiment.

Referring to FIG. 4, a cross-sectional view of cable 10 taken parallel to the longitudinal axis of cable 10 is shown according to an exemplary embodiment. As shown in FIG. 4, in one embodiment, armor layer 30 includes a series of alternating peaks 44 and troughs 46 that extend in the circumferential direction of cable 10. In this embodiment, sleeve 48 generally follows the contours, the peaks and troughs of armor layer 30 such that sleeve 48 generally extends radially inward into at least some of troughs 46. In various embodiments, the radially inward facing surface 60 of sleeve 48 is in substantially constant or even contact with the outer surface of armor 30.

In addition, the material of cable jacket 12 also generally extends radially inward into at least some of troughs 46. Thus, as shown both sleeve 48 and the material of cable jacket 12 have at least some portions in which the radial position of the portion of sleeve 48 and of jacket 12 are below the peaks 44 of armor layer 30. In various embodiments, sleeve 48 extends into at least 50% of troughs 46 of armor layer 30, and the polymer material of cable body 12 extends into at least 50% of the troughs of the corrugated metal material of the reinforcement sheet. In certain embodiments, cable body 12 is extruded over both sleeve 48 and armor layer 30 under pressure such that the material of cable body 12 pushes sleeve 48 into troughs 46 as shown in FIG. 4. In various embodiments, it is believed that the filling of troughs 46 with the material of sleeve 48 and the material of cable body 12 limits stress concentrations and resulting crack formation that may otherwise result from relative movement between these components as cable 10 is bent, twisted, etc. In various embodiments, it is believed that the filling of corrugated armor troughs 46 provides additional structural integrity to the corrugated armor layer 30. The filling provides structural support to prevent armor cracking which may lead to jacket cracking after repeated lateral flexing. This jacket cracking is a different failure mode than the typical lateral-torsional jacket cracking observed in high temperature environments.

In various embodiments, the present disclosure relates to a process or method of forming a high-temperature and crack resistant optical communication cable, such as cable 10. The method includes providing a plurality of elongate optical transmission elements, such as fibers 18 and buffer tubes 20. The method includes wrapping a sheet of reinforcement material, such as corrugated armor 30, around the plurality of elongate optical transmission elements such that the plurality of elongate optical transmission elements are located within a channel defined by an inner surface of the wrapped sheet of reinforcement material. The method includes wrapping an adhesion barrier sheet, such as sleeve 48, around the wrapped sheet of reinforcement material such that the plurality of elongate optical transmission elements and the wrapped sheet of reinforcement material are located within a channel defined by an inner surface of the wrapped adhesion barrier sheet. The method includes extruding polymer material over the wrapped adhesion barrier sheet to form a cable jacket, such as cable jacket 12.

In various embodiments of the method, the polymer material is extruded at an extrusion temperature that limits penetration of the extruded polymer material through the adhesion barrier to reduce adhesion between the cable jacket and the reinforcement material. In various embodiments, the extrusion temperature is selected to both permit extrusion and also to maintain viscosity of the material high enough that the material of the cable body during extrusion does not flow through the material of the adhesion barrier. In one embodiment of the method, the extrusion temperature is less than 200 degrees Celsius, specifically is between 170 degrees and 190 degrees Celsius and more specifically is about 180 degrees (plus or minus 1 degrees) Celsius. In one embodiment, to form the cable jacket, a draw-down ratio used during tubing setup is about 1.8. In various embodiments of the method, the extruded polymer material is a LSZH polyethylene material. In various embodiments of the method in which the reinforcement sheet is corrugated, the material of the cable jacket is extruded under pressure such that both the material of the adhesion barrier and the material of the cable body fills the corrugations of the reinforcement layer.

As noted above, in a specific embodiment, cable jacket 12 is formed from a LSZH polyethylene material. However, in various embodiments, cable jacket 12 may be a variety of materials used in cable manufacturing, such as medium density polyethylene, polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc. In various embodiments, buffer tubes 20 are formed from one or more polymer material including polypropylene (PP), polybutylene terephthalate (PBT), polycarbonate (PC), polyamide (PA), polyoxymethylene (POM), poly(ethene-co-tetrafluoroethene) (ETFE), etc.

While the specific cable embodiments discussed herein and shown in the figures relate primarily to cables and core elements that have a substantially circular cross-sectional shape defining substantially cylindrical internal bores, in other embodiments, the cables and core elements discussed herein may have any number of cross-section shapes. For example, in various embodiments, cable jacket 12 and/or buffer tubes 20 may have an oval, elliptical, square, rectangular, triangular or other cross-sectional shape. In such embodiments, the passage or lumen of the cable or buffer tube may be the same shape or different shape than the shape of cable jacket 12 or buffer tube. In some embodiments, cable jacket 12 and/or buffer tube may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A high-temperature and crack resistant optical communication cable comprising:
   an extruded cable body formed from a polymer material, the cable body having an inner surface defining a channel within the cable body;
   a plurality of optical transmission elements located within the channel;
   a reinforcement sheet having a first lateral edge and an opposing second lateral edge, the reinforcement sheet wrapped around the plurality of optical transmission elements such that the first lateral edge of the reinforcement sheet overlaps the second lateral edge of the reinforcement sheet forming a reinforcement overlap portion; and
   an adhesion barrier layer having a first lateral edge and a second lateral edge, the adhesion barrier layer wrapped around the wrapped reinforcement sheet such that the first lateral edge of the adhesion barrier layer overlaps the second lateral edge of the adhesion barrier layer forming an adhesion barrier overlap portion, wherein the adhesion barrier layer is a substantially uninterrupted adhesion barrier layer such that the adhesion barrier layer acts to prevent substantial adhesion between the polymer material of the cable body and an outer surface of the wrapped reinforcement sheet;

wherein the adhesion barrier layer has a thickness between 200 micrometers and 400 micrometers, wherein the adhesion barrier layer includes at least one section having an outer surface area of 50 square centimeters in which the maximum penetration of the polymer material of the cable body into the adhesion barrier layer is less than 90% of the thickness of the adhesion barrier layer.

2. The optical communication cable of claim 1 wherein the adhesion barrier layer acts to prevent substantial adhesion between the polymer material of the cable body and the outer surface of the wrapped reinforcement sheet such that a peel force required to separate half of the cable body from the reinforcement sheet is less 5 lbs.

3. The optical communication cable of claim 1 wherein the substantially uninterrupted adhesion barrier layer has through-hole area density of less than 5 percent.

4. The optical communication cable of claim 1 wherein the adhesion barrier is formed from a nonwoven material, wherein the nonwoven material of the adhesion barrier layer has an outer surface in contact with the inner surface of the cable body and an inner surface in contact with the outer surface of the reinforcement sheet.

5. The optical communication cable of claim 4 wherein the adhesion barrier layer comprises an upper layer of nonwoven material, a lower layer of nonwoven material and particulate material between the upper layer of nonwoven material and the lower layer of nonwoven material.

6. The optical communication cable of claim 4 wherein the polymer material of the cable body is low smoke zero halogen polyethylene material, wherein the adhesion barrier layer includes a Mylar backing layer, and further wherein the reinforcement sheet is a corrugated metal material.

7. The optical communication cable of claim 1 wherein the adhesion barrier overlap section is circumferentially offset from the reinforcement overlap section such that no portion of the adhesion barrier overlap section overlaps the reinforcement overlap section.

8. The optical communication cable of claim 7 wherein the adhesion barrier overlap section is centered within plus or minus 45 degrees from the 6 o'clock position, and the reinforcement overlap section is centered within plus or minus 45 degrees from the 12 o'clock position.

9. The optical communication cable of claim 1 wherein the reinforcement sheet comprises a corrugated metal material defining a series of circumferentially extending peaks and troughs, wherein the adhesion barrier layer extends radially inward into at least some of the troughs of the corrugated metal material of the reinforcement sheet.

10. The optical communication cable of claim 9 wherein the polymer material of the cable body extends radially into at least some of the troughs of the corrugated metal material such that the adhesion barrier layer is located between the inner surface of the cable body and the outer surface of the reinforcement sheet within the at least some troughs.

11. The optical communication cable of claim 10 wherein the adhesion barrier layer extends into at least 50% of the troughs of the corrugated metal material of the reinforcement sheet, wherein the polymer material of the cable body extends into at least 50% of the troughs of the corrugated metal material of the reinforcement sheet.

12. An optical communication cable comprising:
a cable jacket formed from a polymer material, the cable jacket having an inner surface defining a channel within the cable jacket;
a plurality of optical transmission elements located within the channel;
an armor layer wrapped around the plurality of optical transmission elements; and
a sleeve of material surrounding the armor layer, the sleeve having an inner surface facing the armor layer and an outer surface facing the cable jacket, wherein both the inner surface and the outer surface of the sleeve extend entirely around the armor layer when viewed in a cross-section perpendicular to a long axis of the channel, and further wherein both the inner surface and the outer surface of the sleeve are continuous lengthwise for at least 50 centimeters of the length of the cable;
wherein the sleeve is formed from a nonwoven material, wherein the sleeve of nonwoven material has a thickness between 150 micrometers and 450 micrometers, wherein the sleeve of nonwoven material includes at least one section having an outer surface area of 50 square centimeters in which the maximum penetration of the polymer material of the cable jacket through the sleeve of nonwoven material is less than 90 percent of the thickness of the nonwoven material.

13. The optical communication cable of claim 12 wherein the polymer material of the cable jacket is a low smoke zero halogen polymer material, wherein the sleeve of nonwoven material includes a Mylar backing layer, and further wherein the armor layer is a corrugated material, wherein the sleeve of nonwoven material acts to prevent substantial adhesion between the polymer material of the cable jacket and an outer surface of the armor layer such that a peel force required to separate the cable jacket from the armor layer is less than 5 lbs. per side of the cable jacket.

14. The optical communication cable of claim 12 wherein the armor layer has a first lateral edge and an opposing second lateral edge, wherein the first lateral edge of the armor layer overlaps the second lateral edge of the armor layer forming an armor overlap, wherein the sleeve of nonwoven material is formed from a sheet of nonwoven material wrapped around the armor layer, wherein the sleeve of nonwoven material has a first lateral edge and an opposing second lateral edge, wherein the first lateral edge of the sleeve of nonwoven material overlaps the second lateral edge of the sleeve of nonwoven material forming a sleeve overlap, wherein the sleeve overlap is circumferentially offset from the armor overlap such that no portion of the sleeve overlap is radially aligned with the armor overlap.

15. A method of forming a high-temperature and crack resistant optical communication cable comprising:
providing a plurality of elongate optical transmission elements;
wrapping a sheet of reinforcement material around the plurality of elongate optical transmission elements such that the plurality of elongate optical transmission elements are located within a channel defined by an inner surface of the wrapped sheet of reinforcement material;
wrapping an adhesion barrier sheet around the wrapped sheet of reinforcement material such that the plurality of elongate optical transmission elements and the wrapped sheet of reinforcement material are located within a channel defined by an inner surface of the wrapped adhesion barrier sheet; and
extruding polymer material over the wrapped adhesion barrier sheet to form a cable jacket, wherein the polymer material is extruded at an extrusion temperature that limits penetration of the extruded polymer material through the adhesion barrier to reduce adhesion between the cable jacket and the reinforcement material, wherein an adhesion barrier sheet is an uninterrupted sheet of a nonwoven material, wherein maximum penetration of the extruded polymer material into the adhesion barrier sheet is less than 20 micrometers in at least one 50 square centimeter section of an outer surface of the adhesion barrier.

16. The method of claim 15 wherein the polymer material is a low smoke zero halogen polyethylene material and the extrusion temperature is less than 200 degrees Celsius.

17. The method of claim 15 wherein the adhesion barrier sheet is between 200 micrometers and 400 micrometers thick, and adhesion between the cable jacket and the reinforcement material is limited such that a peel force required to separate the cable jacket from the reinforcement material is less than 5 lbs. per side of the cable jacket.

* * * * *